(12) United States Patent
Yamauchi et al.

(10) Patent No.: US 9,599,373 B2
(45) Date of Patent: Mar. 21, 2017

(54) HYDROGEN STORAGE HEAT PUMP AND HYDROGEN STORAGE HEAT PUMP SYSTEM

(71) Applicant: KABUSHIKI KAISHA TOYOTA CHUO KENKYUSHO, Nagakute-shi, Aichi-ken (JP)

(72) Inventors: Takafumi Yamauchi, Nagakute (JP); Yasuki Hirota, Nagakute (JP); Masakazu Aoki, Nagakute (JP); Takashi Shimazu, Nagakute (JP)

(73) Assignee: KABUSHIKI KAISHA TOYOTA CHUO KENKYUSHO, Aichi-ken (JP)

( * ) Notice: Subject to any disclaimer, the term of this patent is extended or adjusted under 35 U.S.C. 154(b) by 217 days.

(21) Appl. No.: 14/658,031

(22) Filed: Mar. 13, 2015

(65) Prior Publication Data
US 2015/0345836 A1   Dec. 3, 2015

(30) Foreign Application Priority Data
May 30, 2014   (JP) .................................. 2014-113189

(51) Int. Cl.
*F25B 15/00* (2006.01)
*F25B 17/12* (2006.01)

(52) U.S. Cl.
CPC ............. *F25B 17/12* (2013.01); *Y02B 30/62* (2013.01); *Y02E 60/324* (2013.01)

(58) Field of Classification Search
CPC ....... Y02E 60/321; F17C 11/005; F25B 27/02

USPC .......... 62/46.2, 238.3, 476; 165/104.12, 177
See application file for complete search history.

(56) References Cited

U.S. PATENT DOCUMENTS

| | | | | |
|---|---|---|---|---|
| 2,635,431 A | * | 4/1953 | Bichowsky | ............. F25B 21/00 204/263 |
| 4,599,867 A | * | 7/1986 | Retallick | ............... C01B 3/0005 123/533 |
| 4,799,360 A | * | 1/1989 | Retallick | ............... C01B 3/0005 165/104.12 |

OTHER PUBLICATIONS

Linder, Marc et al., "Experimental Analysis of Fast Metal Hydride Reaction Bed Dynamics," International Journal of Hydrogen Energy, vol. 35, 2010, pp. 8755-8761.

* cited by examiner

*Primary Examiner* — Melvin Jones
(74) *Attorney, Agent, or Firm* — Oliff PLC (57) ABSTRACT

A hydrogen storage heat pump, including: a hydrogen storage unit in which hydrogen gas is stored in a compressed state; a hydrogen flow tube through which the hydrogen gas, which is supplied from the hydrogen storage unit, flows; plural hydrogen absorbing materials that are provided at the hydrogen flow tube, that each have a different absorption pressure at which hydrogen is absorbed, and that are arranged in an order such that the absorption pressure decreases in a hydrogen gas flow direction from the hydrogen storage unit; and a switching valve that is disposed between the hydrogen absorbing materials in the hydrogen flow tube and that switches a flow rate of the hydrogen gas.

12 Claims, 4 Drawing Sheets

HYDROGEN STORAGE HEAT PUMP AND HYDROGEN STORAGE HEAT PUMP SYSTEM

CROSS-REFERENCE TO RELATED APPLICATIONS

This application is based on and claims priority under 35 USC 119 from Japanese Patent Application No. 2014-113189, filed on May 30, 2014.

BACKGROUND OF THE INVENTION

Technical Field

This invention relates to a hydrogen storage heat pump and a hydrogen storage heat pump system.

Description of the Related Art

In recent years, heat recycle systems employing, for example, adsorption-type heat pumps provided with adsorbers that adsorb and desorb fluid have been used in a variety of fields, and the heat recycle systems are applied to cooling and heating equipment, water heaters, and the like.

With regard to materials that can absorb hydrogen and desorb the absorbed hydrogen such as hydrogen absorbing alloys, it is known that a hydrogen adsorption reaction or a desorption reaction is associate with an endothermic and exothermic reaction. As a technique for extracting heat energy by utilizing the hydrogen absorption or desorption for providing heat, there is a report relating to a technique of absorbing hydrogen using a metal hydride and desorbing the absorbed hydrogen, as well as utilizing heat generated during a single hydrogen absorption/desorption (for example, see Marc Linder, Rainer Mertz, Eckart Laurien, "Experimental analysis of fast metal hydride reaction bed dynamics", International Journal of Hydrogen Energy. Vol. 35 (2010), 8755-8761).

SUMMARY OF INVENTION

In a case in which high-pressure hydrogen that is stored in a compressed state is used as a hydrogen source, the high-pressure hydrogen is depressurized to a pressure appropriate for the use in a hydrogen utilization apparatus and then utilized. In this case, pressure equivalent to the reduced pressure is not unutilized and therefore wasted uselessly.

If pressure equivalent to a reduced pressure can be effectively utilized as heat energy with avoiding a mere waste of the pressure, new usage opportunities of heat can be created and an energy use efficiency in hydrogen utilization can be dramatically improved.

For example, a hydrogen absorbing alloy is known as a material suitable for absorbing hydrogen. However, in general, hydrogen absorbed by the hydrogen absorbing alloy or the like is hardly desorbed unless it is heated at a high temperature of from several hundred degrees to approximately 1000° C. Therefore, the utilization of hydrogen is hard and furthermore a heat source for high-temperature heating is required to be prepared or equipped, which causes adverse effect on application target (use application) and system development.

The invention was made in view of the above circumstances. The object of the invention is to provide a hydrogen storage heat pump and a hydrogen storage heat pump system, which facilitate the utilization of hydrogen and produce a larger amount of heat energy (including hot heat and cold heat) than the conventional one by utilizing hydrogen pressure efficiently when high-pressure hydrogen is used as a hydrogen source, and the aim of the invention is to achieve the object.

The following knowledge is obtained, and the invention is achieved based on the knowledge.

That is, in a case in which hydrogen gas is supplied to a hydrogen utilization apparatus using, for example, a high-pressure hydrogen tank filled with compressed hydrogen gas, the compressed hydrogen gas is depressurized to a pressure suitable for use before supplying hydrogen to the hydrogen utilization apparatus or, in a case in which hydrogen is temporally kept absorbed in an intended absorption material, before the absorption. In this case, pressure equivalent to a reduced pressure by depressurization (differential pressure from the pressure before depressurization) is wasted uselessly. If the pressure equivalent to the differential pressure can be extracted by converting it into heat, it will contribute effective utilization of energy.

Among the materials capable of absorbing hydrogen, for example, hydrogen absorbing alloys possess properties of having different pressure at which hydrogen is absorbed, that is, so-called hydrogen equilibrium pressure, depending on the types of alloys. Therefore, each of the hydrogen absorbing alloys having different hydrogen equilibrium pressure can absorbs and desorbs hydrogen under pressure equivalent to its specific equilibrium pressure, and simultaneously the hydrogen absorbing alloys release heat (generate heat) or absorb heat. That is, the utilization of heat in accordance with hydrogen absorption and desorption can be expected.

In view of the above, in the invention, plural hydrogen absorbing materials having different absorption pressure are arranged in an order such that the absorption pressure (hydrogen equilibrium pressure in the case of a hydrogen absorbing alloy) at which hydrogen is absorbed decreases from a hydrogen supply side for supplying high-pressure hydrogen so as to match a pressure level of hydrogen gas supplied from a high-pressure hydrogen tank filled with compressed hydrogen gas. As a result, it is expected that the hydrogen absorbing material at the hydrogen supply side absorbs a relatively high-pressure hydrogen gas and heat energy is obtained due to heat generation associated with the absorption, and that cold heat is obtained heat when the absorbed hydrogen is desorbed. The hydrogen pressure of the supplied hydrogen gas is gradually decreased in the arranged direction of the hydrogen absorbing materials. Since the hydrogen absorbing materials are arranged in an order such that the absorption pressure decreases, hydrogen absorption and desorption are repeated in the hydrogen absorbing materials having an absorption pressure to match the reduced hydrogen pressure. As a result, multistage extraction of hot heat and cold heat from each of the plural hydrogen absorbing materials can be achieved. Accordingly, high thermal efficiency can be achieved and more heat energy than conventional can be utilized.

In this manner, in a case in which plural hydrogen absorbing materials having different absorption pressure are arranged in an order such that the absorption pressure at which hydrogen is absorbed decreases from a hydrogen supply side to a downstream side, at which the hydrogen pressure is decreased with hydrogen gas flows, pressure of high-pressure hydrogen can be efficiently converted into heat and can be efficiently extracted as heat energy.

In order to achieve the above object, a hydrogen storage heat pump according to the first embodiment of the invention include a hydrogen storage unit in which hydrogen gas is stored in a compressed state; a hydrogen flow tube through which the hydrogen gas supplied from the hydrogen storage unit flows; plural hydrogen absorbing materials that are provided at the hydrogen flow tube, each have a different absorption pressure at which hydrogen is absorbed, and arranged in an order such that the absorption pressure decreases in a hydrogen gas flow direction from the hydrogen storage unit; and a switching valve that is disposed between the hydrogen absorbing materials in the hydrogen flow tube and that switches a flow rate of the hydrogen gas.

In the first embodiment of the invention, in the flow channel through which high-pressure hydrogen supplied from the hydrogen storage unit of storing the high-pressure hydrogen gas, plural hydrogen absorbing materials are arranged in an order such that the absorption pressure decreases from the upstream to the downstream in a hydrogen flow direction. It is preferable that the plural hydrogen absorbing materials are serially provided at the hydrogen flow tube. Furthermore, hydrogen is absorbed and desorbed by the hydrogen absorbing material having an absorption pressure to match the hydrogen pressure, which is gradually decreased in a hydrogen flow direction. Therefore, not only the pressure of the high-pressure hydrogen is utilized for a single hydrogen absorption, but also the high pressure of the high-pressure hydrogen is utilized for multistage hydrogen absorption and desorption reaction in each of the plural hydrogen absorbing materials arranged in accordance with a decreasing hydrogen pressure associated with the supply to a hydrogen utilization apparatus. As a result, the pressure of the high-pressure hydrogen can be efficiently converted into heat to be extracted.

Furthermore, since the plural hydrogen absorbing materials having different absorption pressure are arranged in a hydrogen flow direction, hydrogen is easily desorbed from a hydrogen absorbing alloy when cold heat is produced by hydrogen release. Therefore, switching between cold heat production and hot heat production can be easily realized without conventionally utilizing high temperature heating, and energy loss caused by heating for hydrogen release can be suppressed. That is, since absorption pressure of the hydrogen absorbing material arranged at a downstream side is lower than that of the hydrogen absorbing material arranged at a upstream side and thus there is a difference in pressure, hydrogen flow is forced by the pressure difference and hydrogen desorption from the material at a upstream side easily proceeds. Therefore, there is an advantage in that cold heat and hot heat are easily produced.

Furthermore, since hydrogen pressure in the hydrogen storage unit is transferred to the plural hydrogen absorbing alloys as gas pressure instead of heat energy, energy loss, which tends to occur during transfer to plural hydrogen absorbing alloys, can be minimized and high energy efficiency can be realized.

Preferable examples of the hydrogen absorbing material is a fibrous carbon material and a hydrogen absorbing alloy. Among these, the hydrogen absorbing alloy has a specific hydrogen equilibrium pressure depending on the type of metal, and therefore it is easy to arrange the hydrogen absorbing materials in accordance with the predetermined decrease in hydrogen pressure.

More specifically, in a preferable aspect, the hydrogen absorbing alloy is used as the hydrogen absorbing material and plural hydrogen absorbing alloys are arranged in an order such that hydrogen equilibrium pressure, which corresponds to absorption pressure, decreases in a hydrogen flow direction from the hydrogen storage unit.

For example, in such an arrangement, the hydrogen absorbing materials may be configured such that those located in odd-numbered positions (the first, third, fifth, and so on) from the hydrogen storage unit desorb hydrogen gas and those located in even-numbered positions (the second, fourth, sixth, and so on) from the hydrogen storage unit absorb hydrogen gas. In this aspect, cold heat can be produced by an endothermic reaction in the hydrogen absorbing materials located in odd-numbered positions and hot heat can be produced by an exothermic reaction in the hydrogen absorbing materials located in even-numbered positions. Subsequently, in an opposite manner, by absorbing hydrogen gas in the hydrogen absorbing materials located in odd-numbered positions and desorbing hydrogen gas in the hydrogen absorbing materials located in even-numbered positions, hot heat can be produced by an exothermic reaction in the hydrogen absorbing materials located in odd-numbered positions and cold heat can be produced by an endothermic reaction in the hydrogen absorbing materials located in even-numbered positions. That is, in the case of a single hydrogen flow tube on which plural hydrogen absorbing materials are arranged, hot heat and cold heat are intermittently produced from each of the hydrogen absorbing materials arranged.

In the invention, a preferable aspect of the configuration is such that plural hydrogen flow tubes connected to the hydrogen storage unit are provided and plural hydrogen absorbing materials, which have mutually different absorption pressure at which hydrogen is absorbed and arranged in an order such that absorption pressure decreases in a hydrogen flow direction from the hydrogen storage unit, are provided in each of the plural hydrogen flow tubes.

Since the plural hydrogen flow tubes on which the plural hydrogen absorbing materials are arranged are disposed, heat is alternately produced and desorbed by the hydrogen absorbing materials located at the same position from the hydrogen storage unit among the hydrogen flow tubes, which enables continuous production of hot heat and cold heat.

In a case in which plural hydrogen flow tubes on which plural hydrogen absorbing materials are arranged are disposed, a preferable configuration is such that, in the plural hydrogen absorbing materials arranged at the respective hydrogen flow tubes, same hydrogen absorbing material is used for each of the hydrogen absorbing materials located at the m-th position (m≥1) from the hydrogen storage unit. For example, in a case in which three hydrogen flow tubes on which three hydrogen absorbing materials are arranged are disposed, a preferable configuration is such that each of the first hydrogen absorbing materials on the three hydrogen flow tubes from the hydrogen storage unit is the same hydrogen absorbing alloy A having hydrogen equilibrium pressure a, each of the second hydrogen absorbing materials on the three hydrogen flow tubes from the hydrogen storage unit is the same hydrogen absorbing alloy B having hydrogen equilibrium pressure b (b<a), and each of the third hydrogen absorbing materials on the three hydrogen flow tubes from the hydrogen storage unit is the same hydrogen absorbing alloy C having hydrogen equilibrium pressure c (c<b).

In a case in which plural hydrogen flow tubes are disposed as described above, plural hydrogen absorbing materials arranged on the plural hydrogen flow tubes can alternately desorb and absorb hydrogen gas in a hydrogen gas flow direction of each of the plural hydrogen flow tubes.

In the plural hydrogen absorbing materials arranged, hot heat can be obtained by every other one due to heat production associated with hydrogen absorption, and the hydrogen absorbing materials between the hydrogen absorbing materials that absorb hydrogen release (desorb) hydrogen to produce cold heat by heat absorption associated with hydrogen desorption. Therefore, hot heat and cold heat can be alternately produced from the respective hydrogen absorbing materials disposed on the respective hydrogen flow tubes.

For example, the plural hydrogen flow tubes may be configured such that the plural hydrogen absorbing materials on the plural hydrogen gas flow tubes located in odd-numbered positions from the predetermined hydrogen gas flow tube alternately desorb and absorb hydrogen gas in this order in a hydrogen gas flow direction from the hydrogen gas storage unit side, and that the plural hydrogen absorbing materials on the plural hydrogen flow tubes located in even-numbered positions alternately absorb and desorb hydrogen gas in this order in a hydrogen gas flow direction from the hydrogen gas storage unit side. The predetermined hydrogen gas flow tube can be optionally determined, namely, any hydrogen gas flow tube may be the predetermined hydrogen gas flow tube.

Due to the configuration that the hydrogen absorption and desorption function is started in a mutually different order from the hydrogen storage side among the hydrogen flow tubes, hot heat and cold heat can be continuously obtained by a single heat pump.

That is, in order to avoid all of the hydrogen absorbing materials disposed at the same position from the hydrogen storage unit side being set to have the same function (namely, the hydrogen absorption function and the hydrogen desorption function) among the hydrogen flow tubes, for example, an odd-numbered hydrogen flow tube is configured such that the hydrogen absorbing materials located in the first, third, fifth, and so on (odd-numbered) positions from the hydrogen storage unit absorb hydrogen, and an even-numbered hydrogen flow tube is configured such that the hydrogen absorbing materials located in the first, third, fifth, and so on (odd-numbered) positions desorb hydrogen.

For example, in a case in which two hydrogen flow tubes of a first hydrogen flow tube and a second hydrogen flow tube are provided, the first hydrogen flow tube may be configured such that the hydrogen absorbing materials located in the odd-numbered positions from the hydrogen storage unit side desorb hydrogen gas and the hydrogen absorbing materials located in the even-numbered positions absorb hydrogen gas, the second hydrogen flow tube may be configured such that the hydrogen absorbing materials located in the odd-numbered positions from the hydrogen storage unit side absorb hydrogen gas and the hydrogen absorbing materials located in the even-numbered positions from the hydrogen storage unit side desorb hydrogen gas.

It is preferable that each or all of the hydrogen absorbing materials connected to the hydrogen flow tube are provided with a first heat source that is thermally connected to the hydrogen absorbing material when the hydrogen absorbing material desorbs hydrogen and recovers cold heat from the hydrogen absorbing material for utilizing the cold heat in a cold heat utilization apparatus and a second heat source that is thermally connected to the hydrogen absorbing material when the hydrogen absorbing material absorbs hydrogen and recovers hot heat from the hydrogen absorbing material for utilizing the hot heat in a hot heat utilization apparatus.

In the heat absorbing material, an amount of heat when hydrogen is absorbed and an amount of heat when hydrogen is released (desorbed) are different, and therefore loss of heat energy can be minimized in a case in which the two heat sources are connected to each of the hydrogen absorbing materials.

It is preferable that temperature $t^1$ of the first heat source and temperature $t^2$ of the second heat source satisfy a relationship expressed by temperature $t^1 \leq$ temperature $t^2$. More specifically, the temperature $t^1$ is preferably set to a range of from 20° C. to 35° C. (for example, temperature in automobile), and the temperature $t^2$ is preferably set to a range of from 35° C. to 50° C. (for example, temperature outside of automobile).

Examples of the first heat source to which cold heat is supplied include a circulatory system in which a refrigerant circulates for utilizing the cold heat. The cold heat can be utilized by connecting the circulatory system to a cold heat utilization apparatus (e.g., a cooling apparatus, a temperature control apparatus such as an air conditioner).

Examples of the second heat source to which hot heat is supplied include a heat converter for converting heat to the air environment. The hot heat can be utilized by connecting the heat converter to a hot heat utilization apparatus (e.g., a heating apparatus, a temperature control apparatus such as an air conditioner).

It is preferable that absorption pressure $p^1$ (hydrogen equilibrium pressure in the case of the hydrogen absorbing alloy) at which hydrogen is absorbed at a temperature of the first heat source and absorption pressure $p^2$ (hydrogen equilibrium pressure in the case of the hydrogen absorbing alloy) at which hydrogen is absorbed at a temperature of the second heat source satisfy a relationship expressed by $p^1 \geq p^2$.

The hydrogen absorption capacity of the hydrogen absorbing material is high at a temperature region of the first heat source, which is lower than that of the second heat source, and therefore hydrogen absorption is easily achieved. Furthermore, the hydrogen desorption capacity of the hydrogen absorbing material is high at a temperature region of the second heat source, which is higher than that of the first heat source, and therefore hydrogen desorption is more easily achieved. Accordingly, the utilization of hydrogen is facilitated.

A hydrogen storage heat pump system according to the second embodiment of the invention is configured such that it includes the hydrogen storage heat pump according to the first embodiment of the invention, and a hydrogen utilization apparatus that is connected to the hydrogen flow tube of the hydrogen storage heat pump and to which depressurized hydrogen gas is supplied.

In the second embodiment, the above-described hydrogen storage heat pump according to the first embodiment of the invention is included, and therefore, when utilizing the hydrogen utilization apparatus, pressure difference of high-pressure hydrogen is converted to heat and extracted as heat energy and hydrogen gas depressurized to a hydrogen pressure of near atmospheric pressure is supplied. In this manner, energy that is conventionally wasted and unutilized can be utilized as heat energy. Accordingly, an energy use efficiency of the entire system can be dramatically improved.

According to the invention, there is provided a hydrogen storage heat pump and a hydrogen storage heat pump system, which facilitate the utilization of hydrogen and produce a larger amount of heat energy (including hot heat and cold heat) than the conventional one by utilizing hydrogen pressure efficiently when high-pressure hydrogen is used as a hydrogen source.

DETAILED DESCRIPTION OF THE INVENTION

Hereinbelow, an embodiment of a hydrogen storage heat pump according to the invention is described more specifically with reference to FIGS. 1 to 4. In accordance with the description, the details of a hydrogen storage heat pump system provided with the hydrogen storage heat pump are also provided. However, the invention is not limited to the embodiments described below.

Figure 1:
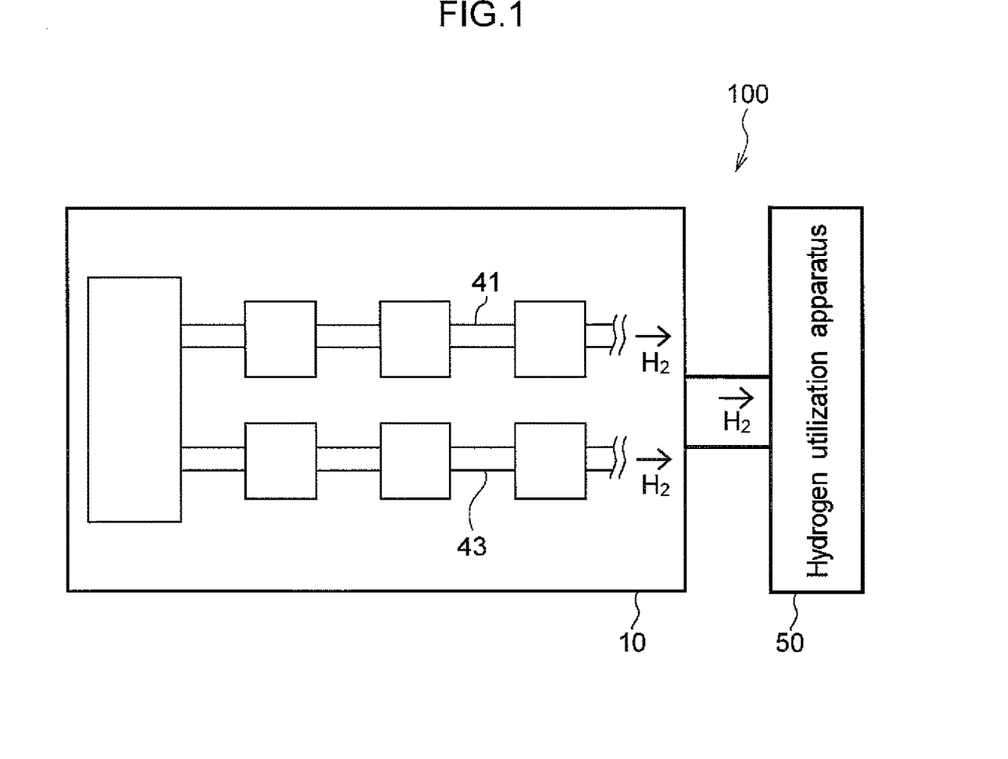
FIG. 1 is a schematic configuration diagram illustrating a structure of a hydrogen storage heat pump system according to an embodiment of the invention.

As shown in FIG. 1, a hydrogen storage heat pump system 100 according to the embodiment is configured such that it includes a hydrogen storage heat pump 10 and a hydrogen utilization apparatus 50. In this system, high-pressure hydrogen is depressurized while extracting heat energy in the hydrogen storage heat pump 10 and hydrogen whose pressure reached a pressure suitable for supply to a hydrogen utilization apparatus is supplied to the hydrogen utilization apparatus 50.

Figure 2:
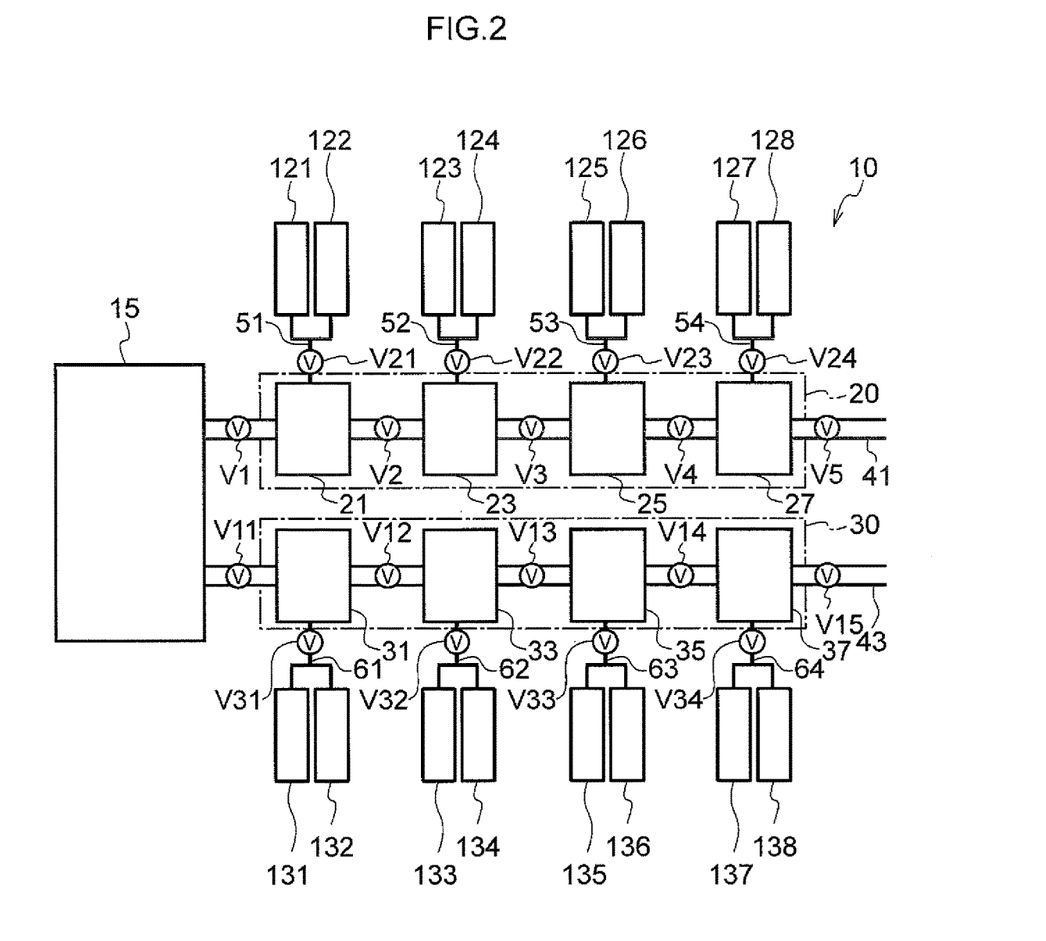
FIG. 2 is a schematic configuration diagram illustrating a structure of a hydrogen storage heat pump according to an embodiment of the invention.

As shown in FIG. 2, the hydrogen storage heat pump 10 includes a high-pressure hydrogen tank 15 that is an example of the hydrogen storage unit; a reactor at which a hydrogen absorbing alloy that is an example of the hydrogen absorbing material is disposed; and a hydrogen flow tube 41 (a first hydrogen flow tube) and a hydrogen flow tube 43 (a second hydrogen flow tube) through which hydrogen gas flow.

To the hydrogen flow tube 41, a first reactor group 20, in which four reactors including a first reactor having a hydrogen absorbing alloy 21, a second reactor having a hydrogen absorbing alloy 23, a third reactor having a hydrogen absorbing alloy 25, and a fourth reactor having a hydrogen absorbing alloy 27 are arranged in line, is connected.

To the hydrogen flow tube 43, similar to the first reactor group 20, a second reactor group 30, in which four reactors including a first reactor having a hydrogen absorbing alloy 31, a second reactor having a hydrogen absorbing alloy 33, a third reactor having a hydrogen absorbing alloy 35, and a fourth reactor having a hydrogen absorbing alloy 37 are arranged in line, is connected.

With regard to the high-pressure hydrogen tank 15, hydrogen is stored in the tank as a reservoir by compressing hydrogen gas to apply high pressure. In the present embodiment, a high-pressure hydrogen tank in which hydrogen pressure of the compressed hydrogen is 70 Mpa (700 atm) is used.

When supplying the stored hydrogen, high-pressure hydrogen gas is supplied from the tank and therefore the hydrogen gas is required to be depressurized to a hydrogen pressure suitable for utilization. In the invention, pressure loss caused when using such high-pressure hydrogen is recovered by extracting it as heat energy, thereby improving energy use efficiency.

The term "high-pressure" means a pressure higher than the atmospheric pressure and generally means a pressure of 10 MPa (100 atm) or higher. From the viewpoint that the function effect of the invention is more effectively exerted, it is preferable that the hydrogen pressure of the pressurized hydrogen is high as far as possible. More specifically, the hydrogen pressure is preferably 15 MPa (150 atm) or higher, and more preferably 30 MPa (300 atm) or higher.

The high-pressure hydrogen tank 15 is connected to respective one ends of the hydrogen flow tubes 41 and 43 through which hydrogen gas flow. The hydrogen utilization apparatus 50 is connected to the other ends of the hydrogen flow tubes 41 and 43 in such a manner that hydrogen gas can be supplied. Through the hydrogen flow tubes 41 and 43, high-pressure hydrogen gas supplied from the high-pressure hydrogen tank 15 as hydrogen gas depressurized to near atmospheric pressure can be supplied to the hydrogen utilization apparatus.

The hydrogen flow tube 41 is provided with the first reactor group 20. As shown in FIG. 2, the first reactor group 20 is configured such that, from the high-pressure hydrogen tank 15 side, four reactors including the first reactor having the hydrogen absorbing alloy 21, the second reactor having the hydrogen absorbing alloy 23, the third reactor having the hydrogen absorbing alloy 25, and the fourth reactor having the hydrogen absorbing alloy 27 are arranged in line. The high-pressure hydrogen gas supplied to the hydrogen flow tube 41 from the high-pressure hydrogen tank 15 is sequentially transferred from the first reactor to the fourth reactor, and, after released from the fourth reactor, supplied to the hydrogen utilization apparatus 50 as hydrogen gas depressurized to a pressure of near atmospheric pressure.

With regard to the respective four hydrogen absorbing alloys disposed in the first reactor group 20 according to the present embodiment, the hydrogen absorbing alloy 21 is $Ti_{0.8}Zr_{0.2}Cr_{0.7}Fe_{1.2}V_{0.1}$ (hydrogen equilibrium pressure [15° C.]=24 MPa (240 atm)), the hydrogen absorbing alloy 23 is $TiCrMn_{0.7}Fe_{0.2}V_{0.1}$ (hydrogen equilibrium pressure [15° C.]=5.6 MPa (56 atm)), the hydrogen absorbing alloy 25 is $Ti_{1.3}Cr_{1.2}Mn_{0.8}$ (hydrogen equilibrium pressure [15° C.]=1.3 MPa (13 atm)), and the hydrogen absorbing alloy 27 is $Ti_{0.7}Zr_{0.3}Mn_{0.8}CrCu_{0.2}$ (hydrogen equilibrium pressure [15° C.]=0.2 MPa (2 atm)).

The four hydrogen absorbing alloys in the first reactor group 20 have such a relation that the hydrogen equilibrium pressure [Pa] is decreased from the high-pressure hydrogen tank 15 side, that is, in an order such that the hydrogen absorbing alloy 21>the hydrogen absorbing alloy 23>the hydrogen absorbing alloy 25>the hydrogen absorbing alloy 27, at a temperature of the first heat source and the second heat source (that is, a temperature at which hydrogen is used) described below.

Similar to the case of the hydrogen flow tube 41, the hydrogen flow tube 43 is provided with the second reactor group 30. As shown in FIG. 2, the second reactor group 30 is configured such that, from the high-pressure hydrogen tank 15 side, four reactors including the first reactor having the hydrogen absorbing alloy 31, the second reactor having the hydrogen absorbing alloy 33, the third reactor having the hydrogen absorbing alloy 35, and the fourth reactor having the hydrogen absorbing alloy 37 are arranged in line. The high-pressure hydrogen gas supplied to the hydrogen flow tube 43 from the high-pressure hydrogen tank 15 is sequentially transferred from the first reactor to the fourth reactor, and, after released from the fourth reactor, supplied to the hydrogen utilization apparatus 50 as hydrogen gas depressurized to a pressure of near atmospheric pressure.

The reactors constituting the second reactor group 30 are provided with, from the high-pressure hydrogen tank 15 side, hydrogen absorbing alloys that are the same types as the hydrogen absorbing alloys disposed in the reactors of the first reactor group 20. That is, the types of the hydrogen absorbing alloys 31, 33, 35, and 37 are the same as those of the hydrogen absorbing alloys 21, 23, 25, and 27, respectively. Therefore, the four hydrogen absorbing alloys disposed on the hydrogen flow tube 43 have such a relation that the hydrogen equilibrium pressure [Pa] is decreased from the high-pressure hydrogen tank 15 side, that is, in an order such that the hydrogen absorbing alloy 31>the hydrogen absorbing alloy 33>the hydrogen absorbing alloy 35>the hydrogen absorbing alloy 37, at a temperature of the first heat source and the second heat source (that is, a temperature at which hydrogen is used) described below.

The hydrogen pressure (hydrogen equilibrium pressure) of the hydrogen absorbing alloy at which the hydrogen absorbing or releasing reaction comes to equilibrium varies depending on the composition thereof, and the hydrogen equilibrium pressure decreases with decreasing temperature. From the viewpoint of utilizing hydrogen with the hydrogen utilization apparatus, the hydrogen absorbing alloy is preferably a material having a hydrogen equilibrium pressure of 0.1 MPa (1 atm) or higher. The hydrogen absorbing alloy can be appropriately selected from alloy materials including two or more metal elements selected from Ti, Co, Zr, Fe, Mn, V, Cu, or Cr in accordance with the intended hydrogen equilibrium pressure.

Specific examples of the hydrogen absorbing alloy include $TiCrMn$, $Ti_{1.05}CrMn$, $Ti_{1.1}CrMn$, $Ti_{1.3}Cr_{1.2}Mn_{0.8}$, $Ti_{1.3}Cr_{0.4}Mn_{1.6}$, $Ti_{1.1}Cr_{0.7}Mn_{1.3}$, $Ti_{1.2}Cr_{0.8}Mn_{1.6}$, $Ti_{1.2}CrMn$, $TiCrMn_{0.7}Fe_{0.2}V_{0.1}$, $Ti_{1.2}Cr_{1.9}Mn_{0.1}$, $Ti_{1.2}Cr_{1.4}Mn_{0.6}$, $Ti_{0.8}Zr_{0.2}Cr_{0.7}Fe_{1.2}V_{0.1}$, $Ti_{0.7}Zr_{0.3}Mn_{0.8}CrCu_{0.2}$, $TiMn_{1.5}$, and $Ti_{0.98}Zr_{0.02}V_{0.43}Fe_{0.09}Cr_{0.05}Mn_{1.5}$.

With regard to the hydrogen absorbing alloys arranged on the single hydrogen flow tube, the hydrogen absorbing alloy arranged at the closest position to the hydrogen storage unit desirably has a hydrogen equilibrium pressure lower than at least the hydrogen pressure of the hydrogen storage unit, and preferably has a hydrogen equilibrium pressure closer to the hydrogen pressure of the hydrogen storage unit.

The hydrogen absorbing alloy arranged at most distant position from the hydrogen storage unit preferably has a hydrogen equilibrium pressure higher than at least 0.1 MPa, in consideration of utilization with the hydrogen utilization apparatus.

In addition, with regard to the hydrogen absorbing alloys arranged on the single hydrogen flow tube, the difference in the hydrogen equilibrium pressure between adjacent hydrogen absorbing alloys is preferably such that the hydrogen equilibrium pressure of the hydrogen absorbing alloy at an upstream side is 3 times to 6 times greater with respect to that of the hydrogen absorbing alloy at a downstream side, from the viewpoints that absorbed hydrogen is easily adsorbed and the adsorbed hydrogen is easily absorbed at a downstream side.

Other than the hydrogen absorbing alloy used in the present embodiment, a fibrous carbon material may be used as the hydrogen absorbing material. Examples of the fibrous carbon material include carbon materials such as carbon fiber, a carbon nanotube, and fullerene.

The hydrogen flow tube 41 is provided with, as an example of switching valve, switching valves V1, V2, V3, and V4 of switching flow rate of hydrogen gas to be flowed, between the high-pressure hydrogen tank 15 and the hydrogen absorbing alloy 21 and between respective hydrogen absorbing alloys 21, 23, 25, and 27. In addition, the hydrogen flow tube 41 is provided with, as an example of switching valve, a switching valve V5 between the hydrogen absorbing alloy 27 and the hydrogen utilization apparatus 50.

The hydrogen flow tube 43 is provided with, as an example of switching valve, switching valves V11, V12, V13, and V14, which switch flow rate of hydrogen gas to be flowed, between the high-pressure hydrogen tank 15 and the hydrogen absorbing alloy 31 and between respective hydrogen absorbing alloys 31, 33, 35, and 37. In addition, the hydrogen flow tube 43 is provided with, as an example of switching valve, a switching valve V15 between the hydrogen absorbing alloy 37 and the hydrogen utilization apparatus 50.

Since switching valves V1 to V5 and V11 to V15 are disposed, the hydrogen absorption or release reaction at the hydrogen absorbing alloys in the respective reactors can be controlled.

As shown in FIG. 2, to the respective hydrogen absorbing alloys arranged on the hydrogen flow tube 41, a first heat source 121 and a second heat source 122, a first heat source 123 and a second heat source 124, a first heat source 125 and a second heat source 126, and a first heat source 127 and a second heat source 128 are connected through branched pipes 51 to 54, respectively. Similar to the hydrogen flow tube 41, a first heat source 131 and a second heat source 132, a first heat source 133 and a second heat source 134, a first heat source 135 and a second heat source 136, and a first heat source 137 and a second heat source 138 are connected to the respective hydrogen absorbing alloys arranged on the hydrogen flow tube 43 through branched pipes 61 to 64, respectively.

The branched pipes 51, 52, 53, and 54 are provided with switching valves V21, V22, V23, and V24, respectively. The switching valves V21 to V24 are switched in accordance with hydrogen absorption or release by the hydrogen absorbing alloys connected through the branched pipes. Through the switching of the switching valves, the reactors (the hydrogen absorbing alloys) are connected to the first heat sources (the first heat sources 121, 123, 125, and 127) involved in heat transfer in a low-temperature region for the exothermic reaction when absorbing hydrogen, while the reactors (the hydrogen absorbing alloys) are connected to the second heat sources (the second heat sources 122, 124, 126, and 128) involved in heat transfer in a middle-temperature region for the endothermic reaction when releasing hydrogen.

The branched pipes 61, 62, 63, and 64 are provided with switching valves V31, V32, V33, and V34, respectively. The switching valves V31 to V34 are switched in accordance with hydrogen absorption or release by the hydrogen absorbing alloys connected through the branched pipes. Similar to the above, through the switching of the switching valves V31 to V34, the reactors are connected to the first heat sources (the first heat sources 131, 133, 135, and 137) when absorbing hydrogen, and the reactors are connected to the second heat sources (the second heat sources 132, 134, 136, and 138) when releasing hydrogen.

In the present embodiment, each of the first heat source (temperature=$t^1°$ C.) and the second heat source (temperature=$t^2°$ C.) connected to each of the hydrogen absorbing alloys has a temperature condition of 15° C., that is, both are set to the same condition ($t^1=t^2=15°$ C.).

Therefore, in the present embodiment, the absorption pressure $p^1$ for absorbing hydrogen at the temperature $t^1$ of the first heat source and the absorption pressure $p^2$ for absorbing hydrogen at the temperature $t^2$ of the second heat source satisfy a relationship expressed by $p^1=p^2$.

In the present embodiment, although not shown in the figure, a circulatory system in which a refrigerant for utilizing the cold heat circulates is connected as the first heat source to which cold heat produced when hydrogen is desorbed and released from the hydrogen absorbing alloy is output. The cold heat can be utilized by connecting the circulatory system to a cold heat utilization apparatus (e.g., a cooling apparatus, a temperature control apparatus such as an air conditioner).

The temperature of the first heat source $t^{1\circ}$ C. is, for example, a temperature in automobile when using a cooling apparatus.

In the present embodiment, although not shown in the figure, a heat converter for converting heat to the air environment is connected as the second heat source to which hot heat generated when hydrogen is absorbed by the hydrogen absorbing alloy is output. The hot heat can be utilized by connecting the heat converter to a hot heat utilization apparatus (e.g., a heating apparatus, a temperature control apparatus such as an air conditioner).

The temperature of the second heat source $t^{2\circ}$ C. is, for example, a temperature outside of automobile when using a cooling apparatus.

The hydrogen utilization apparatus 50 is not particularly limited as long as it functions using hydrogen, and examples thereof include a fuel cell, an apparatus for hydrogen reforming of crude-derived fuel, and a hydrogen engine.

Hereinbelow, the details of the operation of the hydrogen storage heat pump according to the present embodiment are described with reference to FIGS. 3 and 4.

Figure 3:
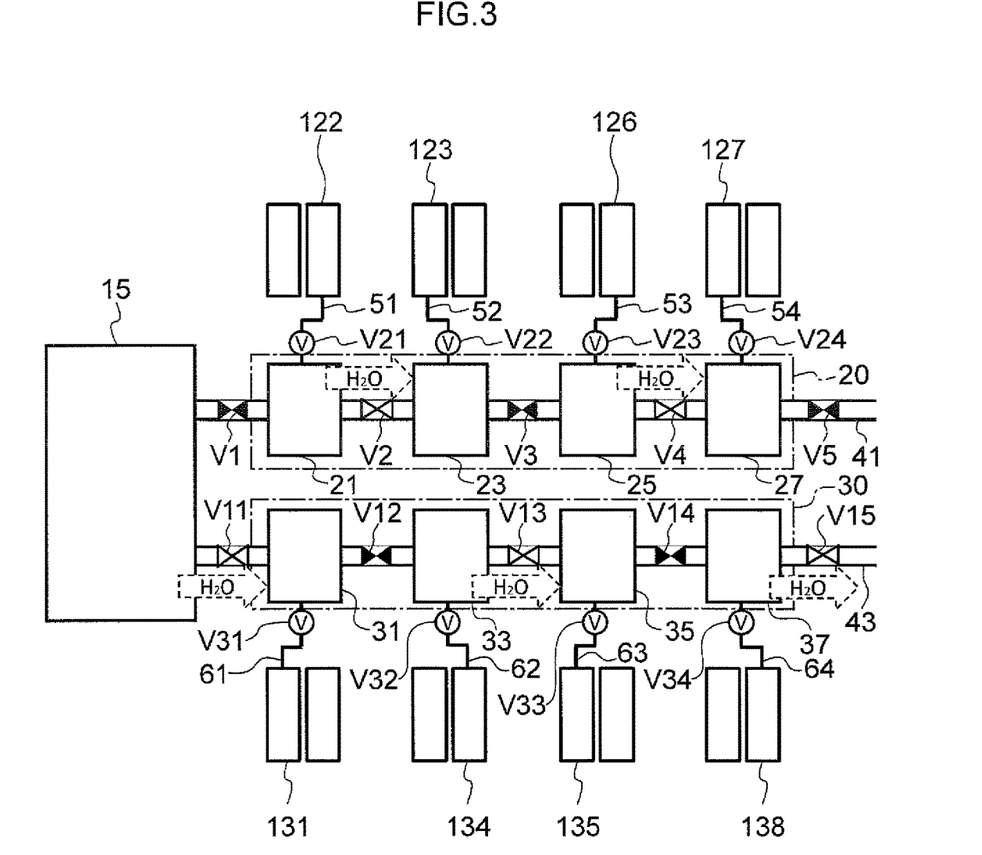
FIG. 3 is a schematic diagram illustrating a part of the operation of a hydrogen storage heat pump according to an embodiment of the invention.

As shown in FIG. 3, in a hydrogen storage heat pump 10 according to the present embodiment, when the power is turned on and hydrogen is requested by a hydrogen utilization apparatus 15, the switching valves V11, V13, and V15 on the hydrogen flow tube 43 are opened, and then the switching valves V2 and V4 on the hydrogen flow tube 41 are opened. At this time, the switching valves V12 and V14 attached to the hydrogen flow tube 43 and the switching valves V1, V3, and V5 attached to the hydrogen flow tube 41 remain closed.

In this case, in the second reactor group 30, high-pressure hydrogen gas of 70 MPa is supplied from the high-pressure hydrogen tank 15 to the first reactor having the hydrogen absorbing alloy 31, middle-pressure hydrogen gas of 5.6 MPa is supplied from the second reactor to the third reactor having the hydrogen absorbing alloy 35, and low-pressure hydrogen gas of near atmospheric pressure is supplied from the fourth reactor to the hydrogen utilization apparatus 50.

In the second reactor group 30, the supplied hydrogen gas is absorbed and the exothermic reaction is caused in the first and third reactors. The switching valves V31 and V33 are activated to connect the first and third reactors with the first heat sources 131 and 135, respectively, each of which forms a connection with the first or third reactor. The heat generated by the hydrogen absorbing alloys of the first and third reactors are transferred to the first heat sources 131 and 135, respectively, and utilized as heat energy by conversion to heat.

In the second and forth reactors of the second reactor group 30, it is necessary to desorb hydrogen absorbed by the hydrogen absorbing alloys and release the desorbed hydrogen, as a hydrogen source to the third reactor and the hydrogen utilization apparatus, to the hydrogen flow tube. For this purpose, the switching valves V32 and V34 are activated to connect the second and fourth reactors with the second heat sources 134 and 138, respectively. In the hydrogen absorbing alloys of the second and fourth reactors that release hydrogen, the endothermic reaction associated with hydrogen desorption proceeds and cold heat is produced. The produced cold heat is utilized in the second heat sources 134 and 138 through a circulatory system not shown in the figure.

In the second reactor group 30, with regard to supply of hydrogen gas from the high-pressure hydrogen tank 15 to the first reactor, hydrogen is easily desorbed from the high-pressure hydrogen tank 15 due to the difference between the hydrogen pressure of the high-pressure hydrogen tank and the hydrogen equilibrium pressure of the hydrogen absorbing alloy 31 under the same temperature condition, and the desorbed high-pressure hydrogen is easily absorbed by the hydrogen absorbing alloy 31 as if the hydrogen flow is forced by the hydrogen absorbing alloy 31 having a lower hydrogen equilibrium pressure.

In a similar manner, with regard to supply of hydrogen gas from the second reactor to the third reactor, hydrogen is easily desorbed from the hydrogen absorbing alloy 33 due to the difference in the hydrogen equilibrium pressure between the hydrogen absorbing alloy 33 and the hydrogen absorbing alloy 35 under the same temperature condition, and the flow of desorbed middle-pressure hydrogen is forced by the hydrogen absorbing alloy 35 having a lower hydrogen equilibrium pressure and the hydrogen is easily absorbed by the hydrogen absorbing alloy 35.

Furthermore, with regard to supply of hydrogen gas from the fourth rector to the hydrogen utilization apparatus, hydrogen is easily desorbed from the hydrogen absorbing alloy 37 due to the difference between the hydrogen equilibrium pressure of the hydrogen absorbing alloy 37 and the hydrogen utilization pressure (that is, atmospheric pressure) in the hydrogen utilization apparatus under the same temperature condition, and the desorbed low-pressure hydrogen is easily supplied to the hydrogen utilization apparatus under atmospheric pressure.

Meanwhile, in the first reactor group 20, middle-pressure hydrogen gas of 24 MPa is supplied from the first reactor to the second reactor having the hydrogen absorbing alloy 23, and middle-pressure hydrogen gas of 1.3 MPa is supplied from the third reactor to the fourth reactor having the hydrogen absorbing alloy 27.

In the first reactor group 20, the supplied hydrogen gas is absorbed and the exothermic reaction is caused in the second and fourth reactors. The switching valves V22 and V24 are activated to connect the second and fourth reactors with the first heat sources 123 and 127, respectively, each of which forms a connection with the second or fourth reactor. The heat generated by the hydrogen absorbing alloys of the second and fourth reactors are transferred to the first heat sources 123 and 127, respectively, and utilized as heat energy by conversion to heat.

In the first and third reactors of the first reactor group 20, it is necessary to desorb hydrogen absorbed by the hydrogen absorbing alloys and release the desorbed hydrogen, as a hydrogen source to the second and fourth reactors, to the hydrogen flow tube. For this purpose, the switching valves V21 and V23 are activated to connect the first and third reactors with the second heat sources 122 and 126, respectively. In the hydrogen absorbing alloys of the first and third reactors that release hydrogen, the endothermic reaction associated with hydrogen desorption proceeds and cold heat is produced. The produced cold heat is utilized in the second heat sources 122 and 126 through a circulatory system not shown in the figure.

In the first reactor group 20, with regard to supply of hydrogen gas from the first reactor to the second reactor, hydrogen is easily desorbed from the hydrogen absorbing alloy 21 due to the difference in the hydrogen equilibrium pressure between the hydrogen absorbing alloy 21 and the hydrogen absorbing alloy 23 under the same temperature condition, and the flow of the desorbed relatively middle-pressure hydrogen gas is forced by the hydrogen absorbing alloy 23 having a lower hydrogen equilibrium pressure and the hydrogen is easily absorbed by the hydrogen absorbing alloy 23.

Similarly, with regard to supply of hydrogen gas from the third reactor to the fourth reactor, hydrogen is easily desorbed from the hydrogen absorbing alloy 25 due to the difference in the hydrogen equilibrium pressure between the hydrogen absorbing alloy 25 and the hydrogen absorbing alloy 27, and the flow of the desorbed middle-pressure hydrogen gas is forced by the hydrogen absorbing alloy 27 having a lower hydrogen equilibrium pressure and the hydrogen is easily absorbed by the hydrogen absorbing alloy 27.

In this manner, in a case in which hot heat is produced by the first and third reactors of the second reactor group 30, cold heat can be produced by the first and third reactors in the first reactor group 20. At the same time, cold heat is produced by the second and fourth reactors in the second reactor group 30, and hot heat is produced by the second and fourth reactors in the first reactor group 20.

Here, provided that an amount of hydrogen thus transferred is A [mol] and an amount of reaction heat of the hydrogen absorbing alloy per 1 [mol] of hydrogen is $\Delta Hi$ [kJ/mol], a total amount of the obtained cold heat Qc [kJ] and a total amount of the obtained hot heat Qh [kJ] are represented by the following equations.

Total amount of the obtained cold heat $Qc$[kJ]=
$(\Delta H1+\Delta H2+\Delta H3+\Delta H4) \times A$ Total amount of the obtained hot heat $Qh$[kJ]=
$(\Delta H1+\Delta H2+\Delta H3+\Delta H4) \times A$ Accordingly, high amount of heat energy can be extracted according to the number i of the reactors (that is, the number of the hydrogen absorbing alloys arranged).

As described above, hot heat is produced by the first and third reactors and cold heat is produced by the second and fourth reactors in the second reactor group 30, while cold heat is produced by the first and third reactors and hot heat is produced by the second and fourth reactors in the first reactor group 20. Subsequently, as shown in FIG. 4, the switching valves V11 to V15 attached to the second reactor group 30 side and the switching valves V1 to V5 attached to the first reactor group 20 side are operated in an opposite manner to the above, whereby hot heat and cold heat can be continuously extracted.

Figure 4:
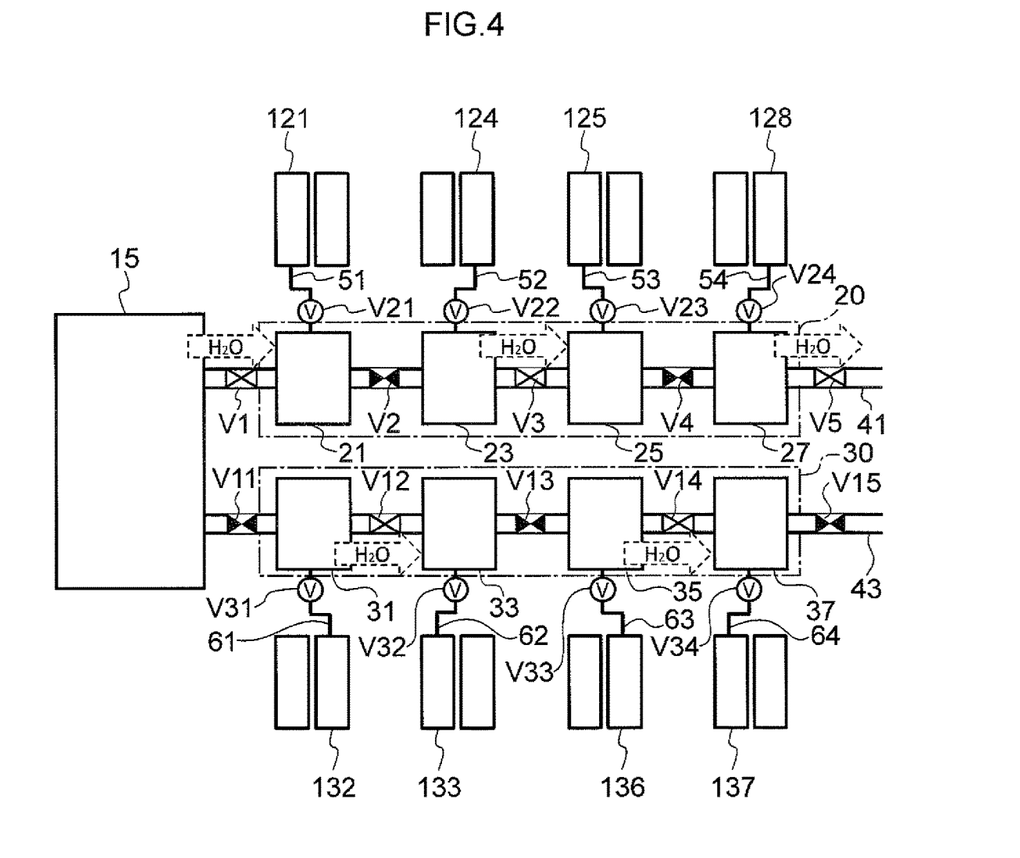
FIG. 4 is a schematic diagram illustrating another part of the operation of a hydrogen storage heat pump according to an embodiment of the invention.

More specifically, as shown in FIG. 4, the switching valves V1, V3, and V5 on the hydrogen flow tube 41 are opened, and the switching valves V12 and V14 on the hydrogen flow tube 43 are also opened. At this time, the switching valves V2 and V4 attached to the hydrogen flow tube 41 and the switching valves V11, V13, and V15 attached to the hydrogen flow tube 43 remain closed.

In the first reactor group 20, since the hydrogen desorption reaction is completed in the first and third reactors as described above, the first and third reactors are in a condition to be capable of absorbing hydrogen. High-pressure hydrogen gas of 70 MPa is supplied from the high-pressure hydrogen tank 15 to the first reactor having the hydrogen absorbing alloy 21, middle-pressure hydrogen gas of 5.6 MPa is supplied from the second reactor to the third reactor having the hydrogen absorbing alloy 25, and low-pressure hydrogen gas of near atmospheric pressure is supplied from the fourth reactor to the hydrogen utilization apparatus 50.

In the first reactor group 20, the supplied hydrogen gas is absorbed and the exothermic reaction is caused in the first and third reactors. The switching valves V21 and V23 are activated to connect the first and third reactors with the first heat sources 121 and 125, respectively, each of which forms a connection with the first or third reactor. The heat generated by the hydrogen absorbing alloys of the first and third reactors are transferred to the first heat sources 121 and 125, respectively, and utilized as heat energy by conversion to heat.

In the second and forth reactors of the first reactor group 20, it is necessary to desorb hydrogen, by the above described operation, absorbed by the hydrogen absorbing alloys and release the desorbed hydrogen, as a hydrogen source to the third reactor and the hydrogen utilization apparatus, to the hydrogen flow tube. For this purpose, the switching valves V22 and V24 are activated to connect the second and fourth reactors with the second heat sources 124 and 128, respectively. In the hydrogen absorbing alloys of the second and fourth reactors that release hydrogen, the endothermic reaction associated with hydrogen desorption proceeds and cold heat is produced. The produced cold heat is utilized in the second heat sources 124 and 128 through a circulatory system not shown in the figure.

In the first reactor group 20, with regard to supply of hydrogen gas from the high-pressure hydrogen tank 15 to the first reactor, hydrogen is easily desorbed from the high-pressure hydrogen tank 15 due to the difference between the hydrogen pressure of the high-pressure hydrogen tank and the hydrogen equilibrium pressure of the hydrogen absorbing alloy 21 under the same temperature condition, and the hydrogen is easily absorbed by the hydrogen absorbing alloy 21 which is positioned downstream in a hydrogen flow direction. In a similar manner, with regard to supply of hydrogen gas from the second reactor to the third reactor, hydrogen is easily desorbed from the hydrogen absorbing alloy 23 due to the difference in hydrogen equilibrium pressure between the hydrogen absorbing alloy 23 and the hydrogen absorbing alloy 25 under the same temperature condition, and the hydrogen is easily absorbed by the hydrogen absorbing alloy 25 adjacent to and downstream of the hydrogen absorbing alloy 23.

Similarly, with regard to supply of hydrogen gas from the fourth reactor to the hydrogen utilization apparatus, hydrogen is easily desorbed from the hydrogen absorbing alloy 27 due to the difference between the hydrogen equilibrium pressure of the hydrogen absorbing alloy 27 and the hydrogen utilization pressure (that is, atmospheric pressure) in the hydrogen utilization apparatus under the same temperature condition, and the hydrogen is supplied to the hydrogen utilization apparatus.

Meanwhile, in the second reactor group 30, middle-pressure hydrogen gas of 24 MPa is supplied from the first reactor to the second reactor having the hydrogen absorbing alloy 33, and middle-pressure hydrogen gas of 1.3 MPa is supplied from the third reactor to the fourth reactor having the hydrogen absorbing alloy 37.

In the second reactor group 30, the supplied hydrogen gas is absorbed and the exothermic reaction is caused in the second and fourth reactors. The switching valves V32 and V34 are activated to connect the second and fourth reactors with the first heat sources 133 and 137, respectively, each of which forms a connection with the second or fourth reactor. The heat generated by the hydrogen absorbing alloys of the second or fourth reactors are transferred to the first heat sources 133 and 137, respectively, and utilized as heat energy by conversion to heat.

In the first and third reactors of the second reactor group 30, it is necessary to desorb hydrogen absorbed by the hydrogen absorbing alloys and release the desorbed hydrogen, as a hydrogen source to the second and fourth reactors, to the hydrogen flow tube. For this purpose, the switching valves V31 and V33 are activated to connect the first and third reactors with the second heat sources 132 and 136, respectively. In the hydrogen absorbing alloys of the first and third reactors that release hydrogen, the endothermic reaction associated with hydrogen desorption proceeds and cold heat is produced. The produced cold heat is utilized in the second heat sources 132 and 136 through a circulatory system not shown in the figure.

In the second reactor group 30, with regard to supply of hydrogen gas from the first reactor to the second reactor, hydrogen is easily desorbed from the hydrogen absorbing alloy 31 due to the difference in the hydrogen equilibrium pressure between the hydrogen absorbing alloy 31 and the hydrogen absorbing alloy 33 under the same temperature condition, and easily absorbed by the hydrogen absorbing alloy 33 adjacent to and downstream of the hydrogen absorbing alloy 31. Similarly, with regard to supply of hydrogen gas from the third reactor to the fourth reactor, hydrogen is easily desorbed from the hydrogen absorbing alloy 35 due to the difference in the hydrogen equilibrium pressure between the hydrogen absorbing alloy 35 and the hydrogen absorbing alloy 37 under the same temperature condition, and the hydrogen is easily absorbed by the hydrogen absorbing alloy 37 adjacent to and downstream of the hydrogen absorbing alloy 35.

In this manner, in a case in which cold heat is produced by the first and third reactors in the second reactor group 30, hot heat can be produced by the first and third reactors in the first reactor group 20. At the same time, hot heat is produced by the second and fourth reactors in the second reactor group 30, and cold heat is produced by the second and fourth reactors in the first reactor group 20.

Similar to the above, in this case, a total amount of the obtained cold heat Qc [kJ] and a total amount of the obtained hot heat Qh [kJ] represented by the following equations can be obtained, and high amount of heat energy can be extracted according to the number of the reactors (that is, the number of the hydrogen absorbing alloys arranged).

Total amount of the obtained cold heat $Qc[\text{kJ}] = (\Delta H1 + \Delta H2 + \Delta H3 + \Delta H4) \times A$ Total amount of the obtained hot heat $Qh[\text{kJ}] = (\Delta H1 + \Delta H2 + \Delta H3 + \Delta H4) \times A$ As described above, according to the present embodiment, cold heat can be produced by the first and third reactors in the first reactor group 20 in a case in which hot heat is produced by the first and third reactors in the second reactor group 30, while hot heat can be produced by the first and third reactors in the first reactor group 20 in a case in which cold heat is produced by the first and third reactors in the second reactor group 30.

At the same time, cold heat is produced by the second and fourth reactors in the second reactor group 30. In a case in which cold heat is produced by the second and fourth reactors, hot heat is produced by the second and fourth reactors in the first reactor group 20. In contrast, in a case in which hot heat is produced by the second and fourth reactors in the second reactor group 30, cold heat is produced by the second and fourth reactors in the first reactor group 20.

As in the case of the present embodiment, two or more hydrogen flow tubes are provided, and plural reactors are disposed on each of the hydrogen flow tubes such that hydrogen absorbing alloys having different hydrogen equilibrium pressure are arranged in an order such that the hydrogen equilibrium pressure decreases, whereby continuous utilization of hot heat and cold heat can be realized.

Although an aspect in which two hydrogen flow tubes are provided is mainly described in the present embodiment, hydrogen supplied from the high-pressure hydrogen tank may be allowed to flow by providing a single hydrogen flow tube. In this case, for example, an aspect in which only the first reactor group provided on the hydrogen flow tube 41 is disposed may be selected from the above-described embodiment. As described above, in the reactors arranged, the hydrogen absorbing alloys located in odd-numbered positions from the high-pressure hydrogen tank 15 side absorb hydrogen, and the hydrogen absorbing alloys located in even-numbered positions desorb hydrogen. Subsequently, the hydrogen absorbing alloys located in odd-numbered positions desorb hydrogen, and the hydrogen absorbing alloys located in even-numbered positions absorb hydrogen. These reactions are repeated, whereby continuous supply of hot heat and cold heat can be realized.

In the hydrogen storage heat pump, three or more hydrogen flow tubes may be arranged. For example, in an aspect in which five hydrogen flow tubes (first to fifth hydrogen flow tubes) are disposed, odd-numbered hydrogen flow tubes may be set to alternately desorb and absorb hydrogen gas in this order in a hydrogen gas flow direction from the high-pressure hydrogen tank (hydrogen gas storage unit) side, and even-numbered hydrogen flow tubes may be set to alternately absorb and desorb hydrogen gas in this order in a hydrogen gas flow direction from the high-pressure hydrogen tank (hydrogen gas storage unit) side.

In this manner, higher amount of hot heat and cold heat than the embodiment already described can be extracted.

Although an aspect in which four reactors are arranged on a single hydrogen flow tube is mainly described in the present embodiment, the number of the reactors is not limited to four, and may be two or three. The reactors may be configured such that five or more reactors are arranged. The increase in the number of the reactors (hydrogen absorbing alloys) arranged results in further improvement of conversion efficiency of hydrogen pressure of the hydrogen storage unit to heat energy, and the extraction of higher amount of hot heat and cold heat can be expected.

10 . . . hydrogen storage heat pump
15 . . . high-pressure hydrogen tank
21, 23, 25, 27, 31, 33, 35, 37 . . . hydrogen absorbing alloy
41, 43 . . . hydrogen flow tube
50 . . . hydrogen utilization apparatus
100 . . . hydrogen storage heat pump system
V1 to V5, V11 to V15 . . . switching valve

What is claimed:

1. A hydrogen storage heat pump, comprising:
a hydrogen storage unit in which hydrogen gas is stored in a compressed state;
a hydrogen flow tube through which the hydrogen gas, which is supplied from the hydrogen storage unit, flows;
a plurality of hydrogen absorbing materials that are provided at the hydrogen flow tube, that each have a different absorption pressure at which hydrogen is absorbed, and that are arranged in an order such that the absorption pressure decreases in a hydrogen gas flow direction from the hydrogen storage unit; and a switching valve that is disposed between the hydrogen absorbing materials in the hydrogen flow tube and that switches a flow rate of the hydrogen gas.

2. The hydrogen storage heat pump according to claim 1, wherein each of the hydrogen absorbing materials is a fibrous carbon material or a hydrogen absorbing alloy.

3. The hydrogen storage heat pump according to claim 1, wherein each of the hydrogen absorbing materials is a hydrogen absorbing alloy, and the plurality of hydrogen absorbing alloys are arranged in an order such that a hydrogen equilibrium pressure, which corresponds to the absorption pressure, decreases in the hydrogen flow direction from the hydrogen storage unit.

4. The hydrogen storage heat pump according to claim 1, wherein a plurality of the hydrogen flow tubes are provided, and a plurality of the hydrogen absorbing materials, that each have a different absorption pressure at which hydrogen is absorbed, and that are arranged in an order such that the absorption pressure decreases in the hydrogen flow direction from the hydrogen storage unit, are provided in each of the plurality of hydrogen flow tubes.

5. The hydrogen storage heat pump according to claim 4, wherein, in the plurality of hydrogen absorbing materials that are arranged at the respective hydrogen flow tubes, the respective hydrogen absorbing materials that are located at an m-th position, wherein m≥1, from the hydrogen storage unit comprise the same hydrogen absorbing material as each other.

6. The hydrogen storage heat pump according to claim 4, wherein the plurality of hydrogen absorbing materials that are arranged at the respective hydrogen flow tubes alternately desorb and absorb hydrogen gas in the hydrogen gas flow direction of the respective hydrogen flow tubes.

7. The hydrogen storage heat pump according to claim 6, wherein the plurality of hydrogen flow tubes are configured such that the plurality of hydrogen absorbing materials on the plurality of hydrogen gas flow tubes located in odd-numbered positions alternately desorb and absorb hydrogen gas in this order in the hydrogen gas flow direction from the hydrogen storage unit side, and the plurality of hydrogen absorbing materials on the plurality of hydrogen flow tubes located in even-numbered positions alternately absorb and desorb hydrogen gas in this order in the hydrogen gas flow direction from the hydrogen storage unit side.

8. The hydrogen storage heat pump according to claim 4, wherein a first hydrogen flow tube and a second hydrogen flow tube are provided, and in a case in which the hydrogen absorbing materials that are located at odd-numbered positions from the hydrogen storage unit side desorb hydrogen gas and the hydrogen absorbing materials located at even-numbered positions from the hydrogen storage unit side absorb hydrogen gas in the first hydrogen flow tube, the hydrogen absorbing materials that are located at odd-numbered positions from the hydrogen storage unit side absorb hydrogen gas and the hydrogen absorbing materials located at even-numbered positions from the hydrogen storage unit side desorb hydrogen gas in the second hydrogen flow tube.

9. The hydrogen storage heat pump according to claim 1, further comprising:
a first heat source that is thermally connected to a hydrogen absorbing material in a case in which the hydrogen absorbing material desorbs hydrogen, and recovers cold heat from the hydrogen absorbing material in order to utilize the cold heat in a cold heat utilization apparatus; and
a second heat source that is thermally connected to the hydrogen absorbing material in a case in which the hydrogen absorbing material absorbs hydrogen, and recovers hot heat from the hydrogen absorbing material for utilizing the hot heat in a hot heat utilization apparatus.

10. The hydrogen storage heat pump according to claim 9, wherein a temperature $t^1$ of the first heat source and a temperature $t^2$ of the second heat source satisfy a relationship of temperature $t^1 \leq$ temperature $t^2$.

11. The hydrogen storage heat pump according to claim 10, wherein an absorption pressure $p^1$ at which hydrogen is absorbed at a temperature of the first heat source and an absorption pressure $p^2$ at which hydrogen is absorbed at a temperature of the second heat source satisfy a relationship of $p^1 \geq p^2$.

12. A heat pump system comprising:
the hydrogen storage heat pump according to claim 1; and
a hydrogen utilization apparatus that is connected to the hydrogen flow tube of the hydrogen storage heat pump and to which depressurized hydrogen gas is supplied.

* * * * *